[34.]

WILLIAM L. HEBERLING.

Improvement in Vegetable Cutters.

No. 118,720.             Patented Sep. 5, 1871.

Witnesses.
H. L. Perrine
E. R. Brown

Inventor.
Wm. L. Heberling

118,720

UNITED STATES PATENT OFFICE.

WILLIAM L. HEBERLING, OF MT. PLEASANT, OHIO, ASSIGNOR TO HIMSELF AND JOHN HEBERLING, OF SAME PLACE.

IMPROVEMENT IN VEGETABLE-CUTTERS.

Specification forming part of Letters Patent No. 118,720, dated September 5, 1871.

*To all whom it may concern:*

Be it known that I, WILLIAM L. HEBERLING, of Mt. Pleasant, in the county of Jefferson and State of Ohio, have invented a new and useful Machine for Cutting Roots for Feeding Stock; and I do hereby declare that the following is a full, clear, and exact description thereof, sufficient to enable those skilled in the art to which my invention appertains to make and use the same, reference being had to the accompanying drawing making part of this specification, and to the letters and figures marked thereon.

My invention relates to a machine for cutting turnips, beets, and other similar roots, such as are used for feeding sheep, cattle, &c.; and it consists in the peculiar construction and arrangement of parts whereby the machine may be made to cut the roots fine enough to be conveniently eaten by lambs and sheep, or coarse enough for horses and cattle; also, in the peculiar form of the cutting-knives, as hereinafter particularly described.

Figure 1:
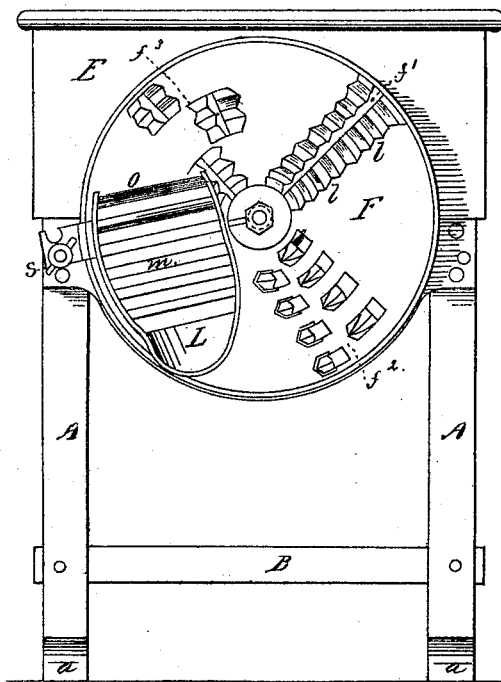
Figure 2:
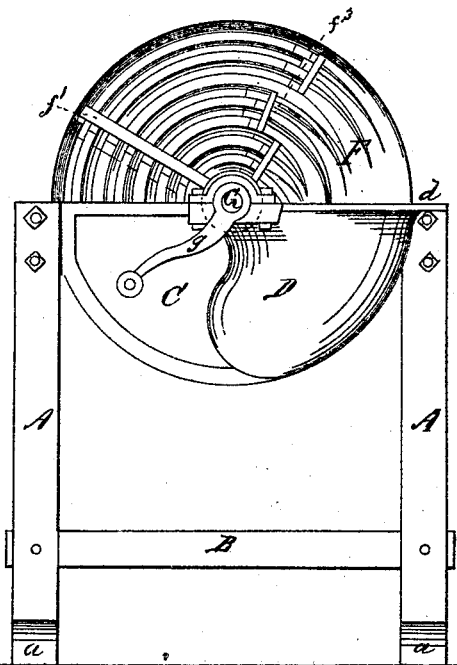
Figure 3:
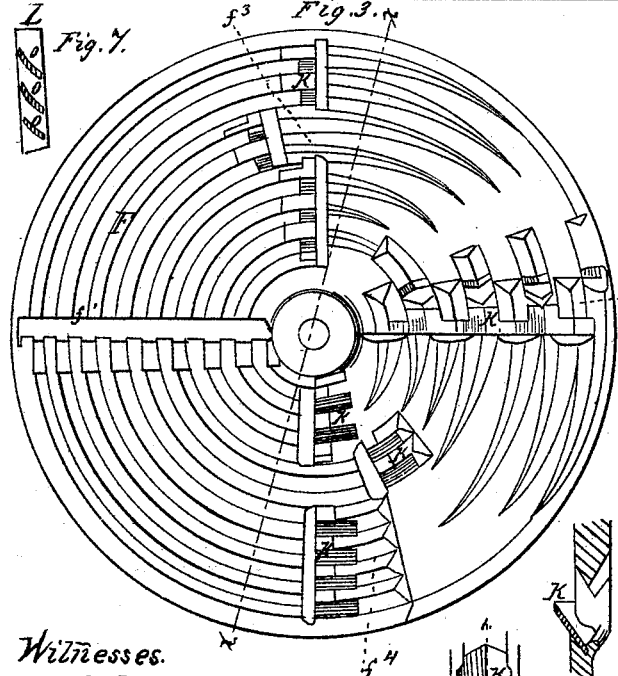
Figure 4:
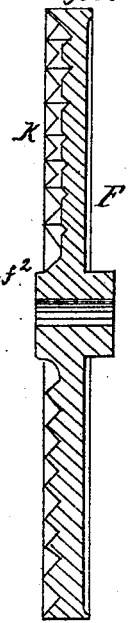
Figure 5:
Figure 6:

In the drawing, Figure 1 is a view of one side of the machine, showing the auxiliary cutting-knives. Fig. 2 is a view of the opposite side of the machine with the wooden box-hopper removed. Fig. 3 is a view of the inner side of the wheel to which the main cutting-knives are attached. Fig. 4 is a transverse section of the same. Fig. 5 shows detached views of different arrangements of the knives. Fig. 6 shows the manner of attaching the knives to the wheel. Fig. 7 is a transverse section of the auxiliary knives shown in Fig. 1.

The machine rests upon a simple frame-work, consisting of two uprights, A A, connected by a cross-bar, B, and having their lower ends mortised into sills *a a*. Attached to the upper portions of the uprights A A is a metallic plate, C, the front portion of which forms the hopper D, into which the roots are placed to be cut. The hopper D is nearly square at the top, and is curved and tapers inward toward the center and lower portion of the plate C, so as to present the roots to the knives in a favorable position for cutting. Around two sides of the top of the hopper D runs a horizontal flange, *d*, upon which the wooden hopper-box E rests, and to which it is attached by bolts or screws. F is a cast-iron wheel, attached to a shaft, G, the inner end of which is journaled in the center of the plate C, and the outer end is journaled in a lug which projects from the outer rear corner of the hopper. To the outer end of the shaft G is attached a crank, *g*, or other suitable means for driving the machine. The wheel F is formed with a plane surface on the outer side; but the inner side, or side toward the hopper, is formed with V-shaped ridges and depressions, as shown in Figs. 2, 3, and 4. These ridges are so arranged that, supposing the wheel to be divided into four quadrants, the tops of the ridges in one quadrant are opposite the bottoms of the ridges in the adjoining quadrants. The ridges also incline toward the outer side of the wheel, so that the tops of the ridges in one quadrant are about on a line with the bottoms of the ridges in the next quadrant, and the space between the bottom of one ridge and the top of the next one is of square or diamond shape, or resembling two V's, with their bases toward each other. The object of this arrangement is to cut the roots into strips having four corners, by means of the knives hereinafter described. At the points where the wheel is divided into quadrants, as aforesaid, there are radial slots, in which the cutting-knives are fixed. These slots may extend from the center to the circumference, as shown at $f^1$, or they may be only long enough to contain one knife, as shown at $f^2$, or two or more knives, as shown at $f^3$ and $f^4$. One of the last three forms may be preferred by some on account of the greater strength of the wheel, as, when thus made, the slot which lies between two others is placed further forward or further backward, so as not to be in the same radial line as the others. The knives K are made of thin sheet-steel, bent in such a form as that the cutting-edge resembles the letter V; or, when continued, the cutting-edge is of a zigzag form. The rear edge of each knife has a slit cut in it, so as to form two tongues capable of being bent in opposite directions, as shown in Fig. 5. On the outside of the wheel F, where the slots occur, are V-shaped depressions, *l*, terminating in a projecting ridge on the outer side and sloping toward the inner side, so that the edge of the slot forms a sharp V-shaped or zigzag edge.

The knives are attached to the wheel by bending every alternate tongue outward toward the outer side of the wheel and then placing the knife in position at the zigzag edge of the slot. The bent tongues are then passed along the V- shaped depressions $l$, and their ends are bent down over the ridges or projections which terminate said depressions, while the alternate tongues, or those which are not bent, fit each on one side of the ridges on the inner side of the wheel. The knives and ridges in each quadrant are gradually inclined from the slot where the knives are attached to the slot which terminates the quadrant, so that the inclination of the knives and of the spaces between them has a tendency to steadily feed the roots toward the knives while the machine is in motion. The number of parts into which the wheel is divided is not important, as there may be more or less than four, as may be preferred.

Instead of having the tongues of the knives alternate singly they may alternate in pairs—that is to say, every two tongues may be placed on the inner side of the wheel and the alternate two pass outside, as shown at $f^2$, Fig. 1. When the V-shaped knives are used singly they are attached to the wheel by fitting in grooves formed in the sides of the V-shaped edge of the slot, as shown in Fig. 6, the rear edges of the knives resting against projections formed for the purpose.

By the peculiar construction and arrangement of these knives the roots are cut in long, curved, four-cornered or diamond-shaped strips, coarse enough for horses and cattle. For cutting the roots fine enough for sheep and lambs and other small animals, I employ an adjustable auxiliary knife or series of knives, so constructed and arranged as to be easily placed out of the way when not in use. A metallic frame, L, is provided with an eye on one side, by which it is pivoted to the outer end of the shaft G, and on the other side is a catch, which engages with a set-screw, S, by which it is held in position. In this frame I affix any number of straight knives in an inclined position. The knives may be flat, as at $m$, or concavo-convex, as at $o$. (See Figs. 1 and 7.) After the roots have been cut by the knives K into four-cornered strips they are forced outward in curved form against the knives $m$ and $o$, by which they are cut transversely into pieces of more convenient size and form for sheep and other small animals. The concavo-convex form may be preferred on account of the greater strength and stiffness which a knife of that form possesses over a flat one.

Instead of having the ridges extend entirely around the inner side of the wheel F, as hereinbefore described, the inner side of the wheel may be a plane surface, entirely without ridges, except near the slots where the knives are attached, as shown at $f^2$, Fig. 3. When made in this form the knives are set in V-shaped ridges, as hereinbefore described, but the ridge terminates immediately behind the rear edge of the knife. If there are no grooves in front of the knife the roots will be cut in three-cornered strips; but by forming short tapering V-shaped grooves in front of the knives, as shown in Fig. 3, at $f^2$ and $f^3$, the roots are cut in four-cornered strips, as before described.

What I claim as new, and desire to secure by Letters Patent, is—

1. The V-shaped or zigzag cutting-edged knives K, constructed and operating substantially as shown and described.

2. The wheel F, formed with ridges on the inner side, substantially as shown and described.

3. The knives $m$ or $o$, as shown and described, when combined with a cutting-wheel, for the purpose specified.

WM. L. HEBERLING.

Witnesses:
 E. R. BROWN,
 JOHN MARTIN.